J. M. TURNER.
Pea and Bean Huller.
No. 210,727. Patented Dec. 10, 1878.
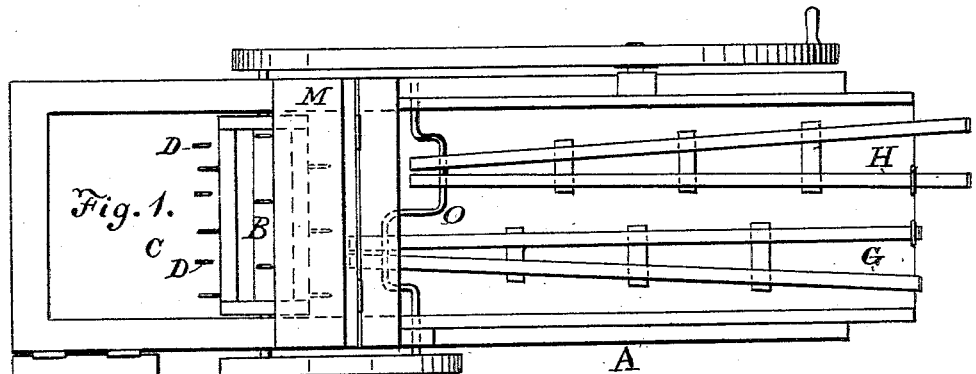
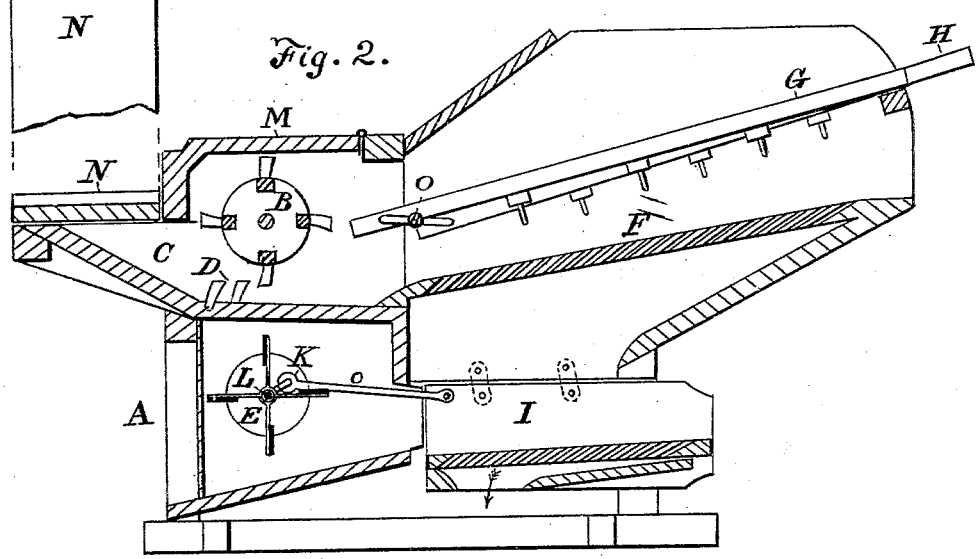
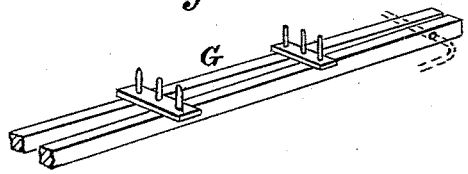
Witnesses:
Inventor:
John M. Turner
by H. J. Ennis
Attorney.

UNITED STATES PATENT OFFICE.

JOHN M. TURNER, OF BETHANIA, NORTH CAROLINA.

IMPROVEMENT IN PEA AND BEAN HULLERS.

Specification forming part of Letters Patent No. 210,727, dated December 10, 1878; application filed May 24, 1878.

*To all whom it may concern:*

Be it known that I, JOHN MICHAEL TURNER, of Bethania, in the county of Forsyth and State of North Carolina, have invented certain new and useful Improvements in Pea and Bean Hullers, including iron-frame cylinder and concave-rake winnower combined; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to machines for shelling or hulling beans and pease; and consists of the improvements in the construction of the same, hereinafter more fully described, and particularly pointed out in the claims.

In the accompanying drawings, in which similar letters of reference indicate like parts of the invention, Figure 1 is a plan of machine with the covers raised. Fig. 2 is a longitudinal section. Fig. 3 illustrates the oscillating rakes.

A suitable frame, A, supports the working mechanism of the machine. A toothed trundle-wheel or toothed cylinder, B, is supported in bearings within a feed-chute, C, the bottom of which, beneath the trundle-wheel or cylinder B, is provided with teeth D. A rotary fan, E, beneath the feed-chute C, blows or winnows the chaff or trash from the beans or pease before they fall from the machine. An inclined stationary screen, F, directly beneath the alternately-oscillating rakes G H, guides and carries the shelled or hulled beans and pease toward the point of discharge, and carries, in conjunction with the alternating rakes G H, the shells or hulls to the tail of the machine.

A shaker, I, in front of the fan E, is agitated by eccentric cams or cranks K K, operated by the shaft L of the fan E, and connected with the shaker I by the hinged rods *o*.

The top or cover M to the toothed trundle-wheel or toothed cylinder B is hinged, so that it may be thrown up to expose the wheel B, to permit it to be cleaned of obstructions.

The entrance to the feed-chute C is covered by a hinged lid, N, which, when open, forms a table, upon which the beans or pease are laid before being fed to the machine. When the lid or table N is closed, it securely holds or locks the cover M in its closed position, and prevents the access of rain or dirt into the feed-chute.

The shafts carrying the mechanism are provided with suitable pulleys and belting to operate the machine.

The beans and pease are fed to the feed-chute in the condition in which they are gathered from the field. The toothed cylinder B acts upon them and separates the kernels from the shells in a manner far superior to the old method of using flails. The beans or pease are carried by the hulls forward until they reach the stationary screen F, through which they fall by their own gravity, when shaken loose by the alternately-oscillating rakes G H, which are attached to the double-crank shaft O. The rakes G H carry the hulls to the tail of the machine, where they are discharged, to be disposed of in any proper manner. Small portions of the hulls and stems fall through screen F with the beans and pease; but the fan E blows them out at the rear of the machine, leaving the beans or pease thoroughly cleaned as they fall from the machine.

The hinged lid N should be closed when the machine is not in use, as well as the hinged cover M over the toothed cylinder B.

Having thus described my invention, what I claim as new and useful, and desire to secure by Letters Patent of the United States, is—

The hinged cover M of the toothed wheel B, in combination with the hinged lid N, the latter serving as a feed-table for the pease and beans when open, and as a lid for the feed-chute, and a locking device for the cover M when closed, substantially as described.

In testimony that I claim the foregoing as my own I affix my signature in presence of two witnesses.

JOHN MICHAEL TURNER.

Witnesses:
JOHN BOYER,
N. S. COOK.